United States Patent [19]

Hozak

[11] Patent Number: 5,236,306

[45] Date of Patent: Aug. 17, 1993

[54] AXIAL BLOWER FOR COOLING THE CONDENSER OF AN AIR CONDITIONER

[75] Inventor: Peter Hozak, Bad Zwischenahn, Fed. Rep. of Germany

[73] Assignee: Licentia Patent-Verwaltungs-GmbH, Frankfurt am Main, Fed. Rep. of Germany

[21] Appl. No.: 907,803

[22] Filed: Jul. 2, 1992

[30] Foreign Application Priority Data

Jul. 3, 1991 [DE] Fed. Rep. of Germany ....... 4122018

[51] Int. Cl.$^5$ .............................. F04D 29/58
[52] U.S. Cl. ................... 416/93 R; 416/144; 415/180; 417/371; 310/62
[58] Field of Search .............. 416/90 A, 90 R, 91, 416/93 A, 93 R, 144; 415/180; 417/371; 310/62

[56] References Cited

U.S. PATENT DOCUMENTS

| 2,573,875 | 11/1961 | Riddiford | 416/144 |
|---|---|---|---|
| 2,951,542 | 9/1960 | Stulen et al. | 416/144 |
| 3,385,516 | 5/1968 | Omohundro | 416/93 R |
| 3,449,605 | 6/1969 | Wilson | 416/93 R |
| 3,932,070 | 1/1976 | Porter et al. | 415/180 |
| 4,476,405 | 10/1984 | Komurasaki | 416/93 R |
| 4,626,720 | 12/1986 | Fukasaku et al. | 416/93 R |
| 4,817,455 | 4/1989 | Buxe | 416/144 |

FOREIGN PATENT DOCUMENTS 632663 7/1936 Fed. Rep. of Germany .... 416/93 R

*Primary Examiner*—Edward K. Look
*Assistant Examiner*—Michael S. Lee
*Attorney, Agent, or Firm*—Spencer, Frank & Schneider

[57] ABSTRACT

An axial blower has a blower motor and a blower wheel. The blower motor includes a motor shaft; a motor housing; a front and a rear bearing cover attached to the motor housing; ventilating openings provided in the front bearing cover; and air outlet openings provided in the rear bearing cover. The blower wheel includes a hollow hub surrounding the rear side of the motor housing; a plurality of impellers affixed to the exterior of the hub and projecting therefrom; a plurality of vane-like ribs carried by the hub at the interior thereof for generating a cooling air stream flowing between the hub and the motor housing; a bell-shaped part forming an axial continuation of the hub and surrounding the front side of the motor housing, a bottom portion, a central opening in the bottom portion and a plurality of ventilating openings provided in the bottom portion. The ventilating openings are arranged in a circular array concentrically with the central opening. The cooling air stream passes through the ventilating openings in the front bearing cover, the outlet openings in the rear bearing cover and the ventilating openings in the bottom portion of the bell-shaped part. A mounting sleeve is firmly held in the central opening of the bottom portion and surrounds the motor shaft for fixedly securing the bell-shaped part to the motor shaft.

19 Claims, 2 Drawing Sheets

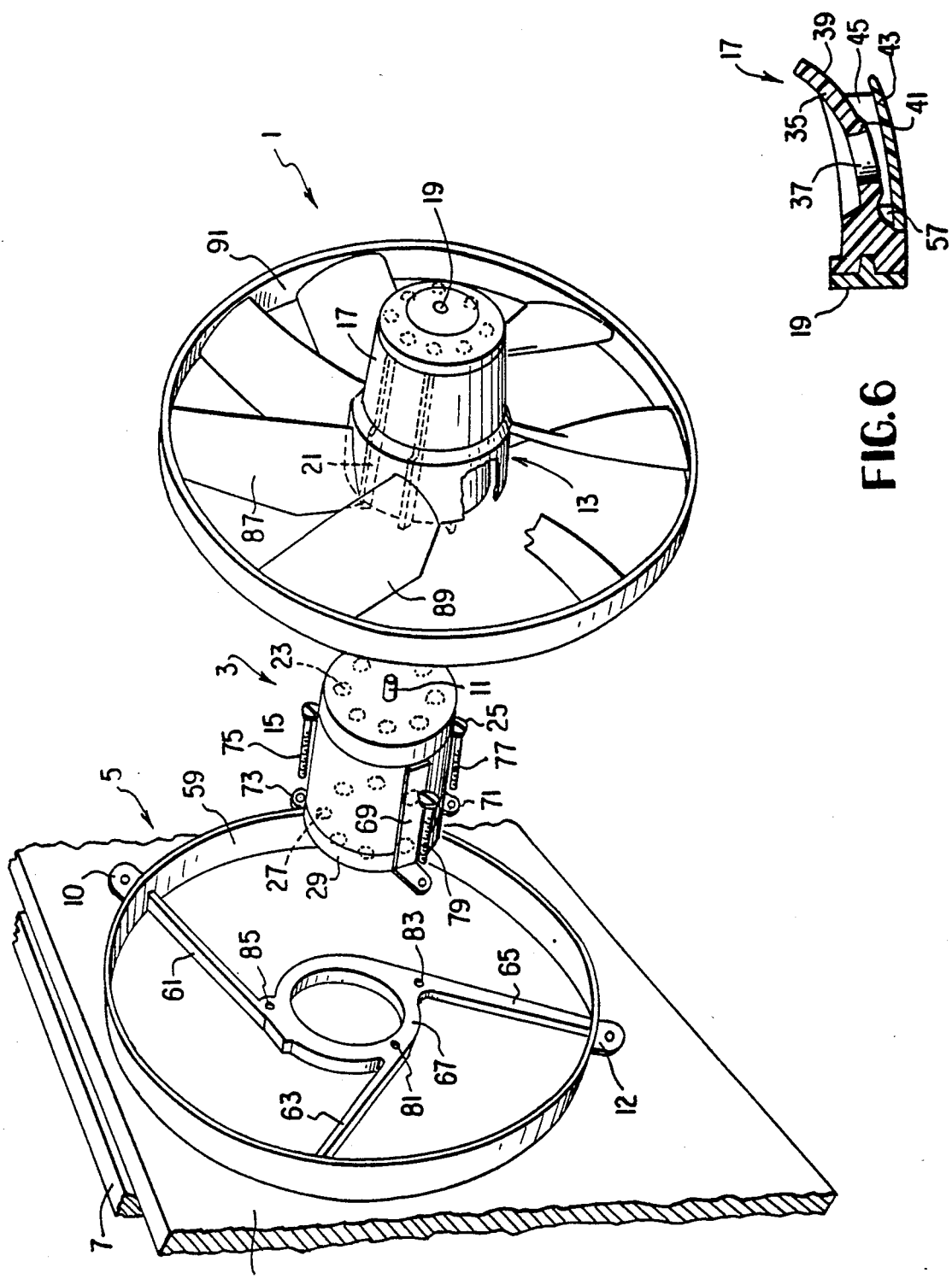

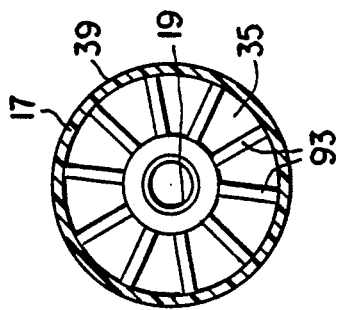
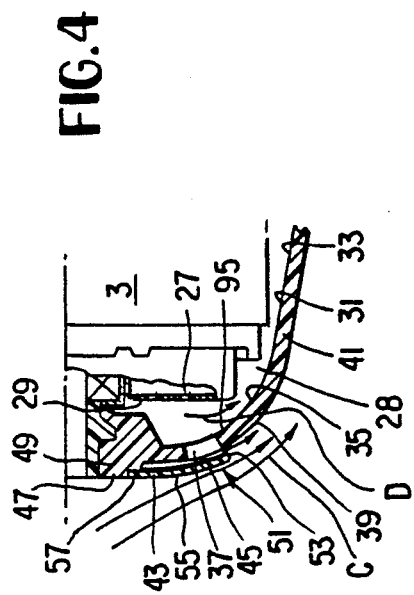
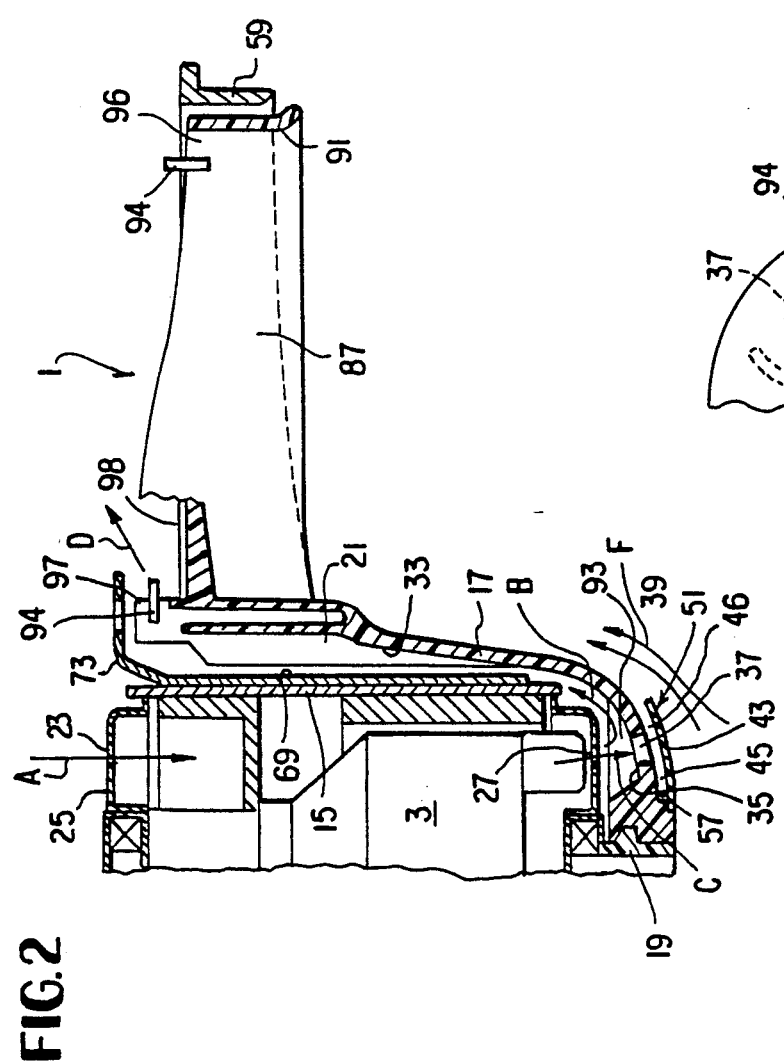
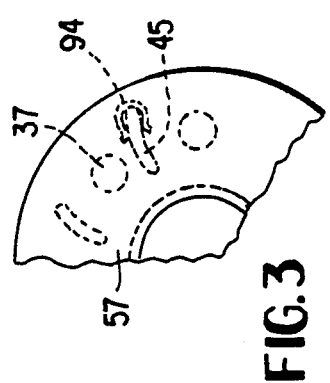

AXIAL BLOWER FOR COOLING THE CONDENSER OF AN AIR CONDITIONER

CROSS REFERENCE TO RELATED APPLICATION

This application claims the priority of German Application No. P 41 22 018.8 filed Jul. 3, 1991, which is incorporated herein by reference.

BACKGROUND OF THE INVENTION

This invention relates to an axial blower, particularly for cooling the condenser which is part of an air conditioner associated with an automotive vehicle and which is situated at the vehicle radiator. The blower has an electric motor whose motor shaft carries a hub of a blower wheel. The hub is affixed to the output end of the motor shaft by a bell-shaped member which is carried by the hub, and which surrounds that part of the motor housing which is oriented towards the output end of the motor shaft. The hub surrounds the housing end which is oriented towards the free shaft end (output end). The blower has vane-like ribs in the hub on that side which is oriented toward the blower wheel, so that the hub, by virtue of its rotation, causes cooling air to flow through the electromotor through ventilating openings in the front bearing cover (lid) to air outlet openings in the rear bearing cover. It is noted that the "front" of the motor housing, as well as the "front" bearing cover is assumed to be situated at the output end of the motor shaft, while the "rear" of the motor housing, as well as the "rear" bearing cover is assumed to be located at the opposite end of the output shaft. The heated cooling air which exits the air outlet openings is guided into the ambient atmosphere through the intermediate space between the outer circumferential surface of the motor housing of the electromotor and the inner ribbed circumferential surface of the hub at the front bearing cover.

Blower manufacturers are compelled to supply very compact and high-efficiency blower units for the cooling of condensers in air conditioners of automotive vehicles, based on customer-required parameters relating to structural volume and output. The structural length available in the vehicle between the front grill and the condenser/cooling unit admits an impeller wheel only of the type which covers the drive motor along its entire length. Further, it is a requirement that the waste heat generated by the high supply voltage at high ambient temperatures has to be securely removed from the electromotor by its own ventilation system.

Axial blowers of the above-outlined type are thus known in which the hub of the blower impeller wheel is bell-shaped, it surrounds the electromotor and is fixedly connected with the end of the motor shaft by means of a support. It is a disadvantage of this arrangement that the bell-shaped hub surrounding the motor housing obstructs an intensive cooling of the motor. A cooling of the motor has been improved in the prior art by providing vane-like ribs on the hub oriented towards the impeller wheel. In this manner, during rotation of the impeller wheel there is effected a flow of coolant air through the electromotor through the ventilating opening in the front bearing cover to air outlet openings in the rear bearing cover, whereby the heated air which exits from the air outlet openings in the rear bearing cover is guided into the ambient atmosphere through the intermediate space between the outer circumferential surface of the motor housing of the electromotor and the inner ribbed circumferential surface of the hub at the front bearing cover.

Further, it is a disadvantage of the prior art that because of the relatively great axial length of the bell-shaped hub, at the two ends thereof imbalance phenomena appear which lead to an increased noise during operation.

SUMMARY OF THE INVENTION

It is an object of the invention to provide an improved axial blower of the above-outlined type which is of simplified construction and in which the guidance of air is improved for achieving a more intensive cooling of the blower motor. It is a further object of the invention to reduce operational noise of the blower motor while maintaining a high efficiency thereof.

This object and others to become apparent as the specification progresses, are accomplished by the invention, according to which, briefly stated, the axial blower has a blower motor and a blower wheel. The blower motor includes a motor shaft; a motor housing; a front and a rear bearing cover attached to the motor housing; ventilating openings provided in the front bearing cover; and air outlet openings provided in the rear bearing cover. The blower wheel includes a hollow hub surrounding the rear side of the motor housing; a plurality of impellers affixed to the exterior of the hub and projecting therefrom; a plurality of vane-like ribs carried by the hub at the interior thereof for generating a cooling air stream flowing between the hub and the motor housing; a bell-shaped part forming an axial continuation of the hub and surrounding the front side of the motor housing, a bottom portion, a central opening in the bottom portion and a plurality of ventilating openings provided in the bottom portion. The ventilating openings are arranged in a circular array concentrically with the central opening. The cooling air stream passes through the ventilating openings in the front bearing cover, the outlet openings in the rear bearing cover and the ventilating ventilating openings in the bottom portion of the bell-shaped part. A mounting sleeve is firmly held in the central opening of the bottom portion and surrounds the motor shaft for fixedly securing the bell-shaped part to the motor shaft.

The axial blower according to the invention effects an intensive exposure of the motor to the circulating coolant air, while maintaining the required protective measures as concerns soiling, damages as well as noise and deterioration of the air output efficiency.

According to a further feature of the invention, the ventilating holes are individually surrounded by a circumferential ridge on the external circumferential surface of the bell-shaped component, and further, the ventilating holes and the ribs are covered by a lid which has a curvature adapted to the radius of curvature of the bell-shaped component. These features prevent water or dirt from entering the hub through the air outlet openings. Further, the air flow through the motor is enhanced by the vacuum which is generated by the principal air flow at the outside of the bell-shaped component in the region of the air outlet openings.

According to a further feature of the invention, the free edge of the lid is rounded and slightly projects beyond the vane-like ribs. This feature reduces the risk of injuries in a simple manner when the blower is operating.

BRIEF DESCRIPTION OF THE DRAWING

FIG. 1 is a perspective exploded view of a preferred embodiment of the invention.

FIG. 2 is an axial sectional view of the preferred embodiment.

FIGS. 3-6 are detail views of components shown in FIGS. 1 and 2.

DESCRIPTION OF THE PREFERRED EMBODIMENT

Turning to FIG. 1, there is illustrated therein, in an exploded view, an axial blower having an impeller wheel 1, an electromotor 3 for driving the impeller wheel (blower wheel) 1 and a supporting element 5 by means of which the axial blower may be mounted to cool a condenser 9 forming part of a vehicle air conditioner. The supporting element 5 is mounted in front of a radiator 7 by securing tabs 10 and 12.

The impeller wheel I is secured to the shaft end 11 of the electromotor 3 by a bell-shaped part 17 which is an axial continuation of the hub 13 of the impeller wheel 1 and surrounding that end of the housing 15 of the electromotor 3 which is oriented towards the shaft end 11. The hub 13 surrounds that end of the housing 15 which is oriented away from the shaft terminus 11, so that the electromotor 3 is surrounded in its entirety.

Vane-like ribs 21 are mounted on the hub 13, at its external circumferential portion which is oriented towards the impellers blades 87. As the hub 13 rotates, the ribs 21 cause a flow of coolant air through the electromotor through ventilation openings 23 in the front bearing cover 25 to air outlet openings 27 in the rear bearing cover 29. The heated air exiting the air outlet openings 27 are guided through the intermediate space 28 between the outer circumferential face 31 of the housing 15 of the electromotor 3 and the inner circumferential surface 33 of the hub 13 (provided with the ribs 21) at the front bearing cover 25 and therefrom the air is released into the ambient atmosphere. This flow of coolant air through the electromotor is further enhanced by the vacuum which is generated by the main air stream by providing at the height of the air outlet openings 27 in the rear bearing cover 29, in the bottom 35 of the bell-shaped part 17, additional ventilating openings 37. These ventilating openings 37 are arranged concentrically to the attachment sleeve (mounting sleeve) 19 in the bell-shaped part 17 of the hub 13. To prevent water from entering the ventilating openings 37 of the impeller wheel 1, circumferential ridges 41 are provided (as shown in FIG. 6) which project from the outer circumferential surface 39 of the part 17 about each ventilating opening 27. Further, the ventilating openings 37 are covered by a lid 43 which prevents dust or water from entering thereinto. The lid 43 is held on the hub 13 at a distance from the bottom of the part 17 of the hub 13 by vane-like ribs 45 which correspond in number to the number of openings 37. The ribs 45 are situated on the outer circumferential surface 39 between the ventilating openings 37. The lid 43 is connected with the ribs 45 by welding and has a radius of curvature which corresponds to that of the bell-shaped part 17.

Particularly referring to FIGS. 2 and 4, the lid 43 has a central circular opening 47 by means of which it is inserted on a stub 49 of the part 17. The free edge 51 of the lid 43 is provided with a rounding 53 and extends slightly beyond the vane-like ribs 45 away therefrom whereby risks of injury from the sharp edges are reduced.

At the bottom of the intermediate space 55 there is provided an annular channel 57 for leading away water between the lid 43 and the bell-shaped component 17. The annular channel 57 extends circumferentially underneath the ventilating openings 37 and the vane-like ribs 45.

It is feasible to make the vane-like ribs 45 and the lid 43 as a one-piece component. In such case, the ribs 45 project from the underside of the lid 43 and are fixedly secured (for example, welded) to the outer circumferential surface 39 of the part 17.

The support element 5 has an annular air guiding ring 59 which is supported on the mount 67 for the electromotor 3 by means of carrier arms 61, 63 and 65 and which, in the installed state, surrounds the blower wheel i. On the housing 59 of the electromotor 3 angled securing brackets 69, 71, 73 are arranged which are firmly connected to the mount 67 of the support 5 by screws 75, 77 and 79 extending into threaded holes 81, 83 and 85. On the outer circumference of the hub 13 there are provided a number of radially aligned impeller vanes 87 in a uniform distribution whose free ends 89 are connected with a cylindrical closing ring 91 which, in turn, is surrounded by the air guiding ring 59 with a small clearance.

Particularly referring to FIGS. 1 and 5, the flow of cooling air through the electromotor 3 is further enhanced by the provision of vane-like ribs 93 mounted on the inner bottom 35 of the bell-shaped part 17 and are radially oriented towards the bearing 19.

By virtue of the advantageous features of the invention, the waste heat generated by the high supply voltage at high environmental temperatures is removed from the electromotor 3 securely by means of its own ventilation system. It is to be noted that the axially relatively long hub 13, together with its bell-shaped part ;7 may lead to imbalance problems which require a balancing of the blower wheel 1 on the impeller side as well as on the lid side of the blower wheel 1. For this purpose, the blower wheel 1 has, adjacent the front and rear sides of the electromotor 3, receiving devices for balancing means such as lockable balancing clips 94. Thus, the balancing clips 94 are inserted o the free ends 95 of the ribs 45 which slightly thicken towards their ends so that the balancing clips 94 inserted from the outside are held securely during rotation of air in addition to their spring bias.

Balancing clips 94 may also be inserted on the outer ends 96 of the blower impellers 87 directly underneath the closing ring 91 or on the free ends 97 of the ribs 21 in the hub 13. The free ends 97 of the ribs 21 project beyond the end face 98 of the hub 13 at the front bearing cover 25. With the aid of the balancing clips 94 a rapid and simple balancing of the blower wheel 1 is possible both at the impellers 87 and at the lid 43.

Upon rotation of the blower wheel 1, the vane-like ribs 21 cause an air flow through the electromotor 3 from its front to its rear side in the direction of the arrow A. The heated coolant air is, upon exiting the outlet openings 27 divided into partial streams B and C at the rear side of the motor 3. The partial stream B is admitted through the intermediate space 28 between the motor housing of the electromotor 3 and the inner circumferential surface 33 of the part 17 of the hub 13 into the ambient atmosphere as designated by the arrow D. The partial air stream C is branched off by the ribs 45 through the ventilating openings 37. This stream is enhanced by the vacuum at the outlet openings 46 between the ribs 45, generated by the main air stream passing by as designated by the arrow F.

The compact and high-efficiency axial blower according to the invention is of low noise and effects an optimal cooling of the electromotor 3.

It will be understood that the above description of the present invention is susceptible to various modifications, changes and adaptations, and the same are intended to be comprehended within the meaning and range of equivalents of the appended claims.

What is claimed is:

1. An axial blower comprising
    (a) a blower motor including
        (1) a motor shaft having an output end;
        (2) a motor housing having a front side adjacent said output end of said motor shaft and a rear side remote from said output end of said motor shaft;
        (3) a front and a rear bearing cover attached to said motor housing at the front and the rear side thereof, respectively;
        (4) ventilating openings provided in said front bearing cover; and
        (5) air outlet openings provided in said rear bearing cover; and
    (b) a blower wheel including
        (1) a hollow hub having an interior and an exterior; said hub surrounding said rear side of said motor housing;
        (2) a plurality of impeller blades affixed to the exterior of said hub and projecting therefrom for generating a main flow of air travelling generally axially along an exterior of the motor housing;
        (3) a plurality of vane-like ribs carried by the hub at the interior thereof for generating a cooling air stream flowing between said hub and said motor housing from said front side to said rear side thereof;
        (4) a bell-shaped part forming an axial continuation of said hub and having an external surface, a bottom portion, a central opening in the bottom portion and a plurality of ventilating openings provided in said bottom portion; said ventilating openings being arranged in a circular array concentrically with said central opening; the cooling air stream passing through said ventilating openings in said front bearing cover, said outlet openings in said rear bearing cover and said ventilating openings in said bottom portion of said bell-shaped part; said bell-shaped part surrounding said front side of said motor housing; and
        (5) a mounting sleeve firmly held in said central opening of said bottom portion and surrounding said motor shaft; said mounting sleeve fixedly securing said bell-shaped part to said motor shaft.

2. The axial blower as defined in claim 1, further comprising ridges provided on said external surface of said bell-shaped part and individually circumferentially surrounding at least some of said air outlet openings in said bottom portion of said bell-shaped part.

3. The axial blower as defined in claim 1, further comprising a plurality of additional vane-like ribs positioned on an inner surface of said bottom portion of said bell-shaped part; said additional vane-like ribs being oriented radially relative to said mounting sleeve.

4. The axial blower as defined in claim 1, wherein said vane-like ribs each have a free end projecting beyond an end face of said hub at said front bearing cover.

5. The axial blower as defined in claim 1, further comprising balancing elements formed of balancing clips inserted on free ends of said vane-like ribs.

6. The axial blower as defined in claim 1, wherein said blower wheel is a plastic.

7. The axial blower as defined in claim 1, further wherein said impellers extend radially from said hub and are uniformly distributed about said hub; said blower wheel further comprising a cylindrical ring surrounding said impellers and being attached to a free end thereof; further comprising a support member for mounting said blower motor on a surface; said support member comprising a central mounting portion holding said blower motor; and an air guiding ring surrounding said cylindrical ring and carrier arms attaching said air guiding ring to said mounting portion.

8. The axial blower as defined in claim 7, further comprising balancing elements formed of balancing clips inserted on said impellers immediately underneath said cylindrical ring.

9. The axial blower as defined in claim 1, further comprising receiving means mounted on said blower wheel at said front and rear sides of said motor housing for accommodating balancing elements.

10. The axial blower as defined in claim 9, further comprising balancing elements formed of balancing clips insertable on said receiving means.

11. The axial blower as defined in claim 1, further comprising additional vane-like ribs situated on said external surface of said bell-shaped part between said air outlet openings provided in said bottom portion of said bell-shaped part.

12. The axial blower as defined in claim 11, further comprising a lid extending over said air outlet openings provided in said bottom portion; said lid and an outer surface of said bottom portion having substantially identical curvatures; and securing means for affixing said lid to said bell-shaped part.

13. The axial blower as defined in claim 12, wherein said securing means comprises a stub projecting from said bottom portion of said bell-shaped part and an opening provided in said lid; said opening in said lid receiving said stub.

14. The axial blower as defined in claim 12, wherein said lid has a rounded free edge projecting beyond said additional vane-like ribs.

15. The axial blower as defined in claim 12, further comprising an intermediate space defined between said lid and an external surface of said bottom portion of said bell-shaped part and an annular, circumferential channel situated at an inner end of said intermediate space underneath said air outlet openings and said additional vane-like ribs; said annular channel being defined by said lid and said bottom portion of said bell-shaped part.

16. The axial blower as defined in claim 12, wherein said additional vane-like ribs are carried on an inner face of said lid oriented toward said bottom portion of said bell-shaped part.

17. The axial blower as defined in claim 12, wherein said additional vane-like ribs are carried on an external surface of said bottom portion, oriented toward said lid.

18. The axial blower as defined in claim 12, further comprising balancing elements formed of balancing clips inserted on free ends of said additional vane-like ribs between said lid and said bottom portion of said bell-shaped part.

19. The axial blower as defined in claim 18, wherein said additional vane-like ribs have outwardly slightly thickening radially outer terminal portions.

* * * * *